United States Patent
Babbar et al.

(10) Patent No.: US 9,813,762 B2
(45) Date of Patent: Nov. 7, 2017

(54) CREATING HASH VALUES INDICATIVE OF DIFFERENCES IN IMAGES

(71) Applicant: ARRIS Enterprises, Inc., Suwanee, GA (US)

(72) Inventors: Gautam Babbar, Philadelphia, PA (US); Olga Malysheva, Lansdale, PA (US); Pierre Brice, Edison, NJ (US); Dan Hillegass, Warrington, PA (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 15/051,137

(22) Filed: Feb. 23, 2016

(65) Prior Publication Data

US 2017/0142479 A1    May 18, 2017

Related U.S. Application Data

(60) Provisional application No. 62/255,970, filed on Nov. 16, 2015.

(51) Int. Cl.
| | |
|---|---|
| *H04N 21/44* | (2011.01) |
| *H04N 21/442* | (2011.01) |
| *G06T 7/40* | (2017.01) |
| *G06F 17/30* | (2006.01) |

(52) U.S. Cl.
CPC .  *H04N 21/44008* (2013.01); *G06F 17/30097* (2013.01); *G06F 17/30858* (2013.01); *G06T 7/408* (2013.01); *H04N 21/44209* (2013.01); *G06T 2207/10016* (2013.01)

(58) Field of Classification Search
CPC ........ H04N 21/44008; H04N 21/44209; G06F 17/30097; G06F 17/30858; G06T 7/408; G06T 2207/10016
See application file for complete search history.

(56) References Cited

U.S. PATENT DOCUMENTS

| | | | |
|---|---|---|---|
| 7,421,128 B2 | 9/2008 | Venkatesan et al. | |
| 7,639,265 B2 | 12/2009 | Evans et al. | |
| 8,644,620 B1 * | 2/2014 | Lam | H04N 19/23 382/209 |
| 2002/0126312 A1 * | 9/2002 | Waksman | H04N 1/6016 358/2.1 |

(Continued)

*Primary Examiner* — Pankaj Kumar
*Assistant Examiner* — Alexander Boyd
(74) *Attorney, Agent, or Firm* — Thomas A. Ward

(57) ABSTRACT

A computer implemented method for hashing an image is provided that includes: receiving a reference image frame; deriving an array of reference hash values to represent the reference image frame, wherein the array of reference hash values includes a first reference hash value, a second reference hash value, and a third reference hash value; receiving an test image frame; deriving an array of hash values to represent the test image frame, wherein the array of hash values includes a first test hash value, a second test hash value, and a third test hash value; subtracting the array of test hash values representing the test image frame from the array of reference hash values representing the reference image frame to produce a delta array, wherein the delta array is indicative of an area where the test image frame differs from the reference image frame.

16 Claims, 4 Drawing Sheets

(56) References Cited

U.S. PATENT DOCUMENTS

| | | | | |
|---|---|---|---|---|
| 2004/0240563 | A1* | 12/2004 | Chiu | H04N 21/4402 375/240.29 |
| 2008/0002894 | A1* | 1/2008 | Hayon | G06F 3/1462 382/232 |
| 2008/0247640 | A1* | 10/2008 | Ukita | G06K 9/38 382/165 |
| 2013/0322696 | A1* | 12/2013 | Nomura | G06K 9/00624 382/103 |

* cited by examiner

CREATING HASH VALUES INDICATIVE OF DIFFERENCES IN IMAGES

CROSS REFERENCE TO RELATED APPLICATION

This Application claims priority under 35 U.S.C. §119(e) from earlier filed U.S. Provisional Application Ser. No. 62/255,970 filed on Nov. 16, 2015 and incorporated herein by reference in its entirety.

FIELD

The disclosure relates generally to the field of methods and systems for hashing image frames such as video image frames.

BACKGROUND

Digital content distribution systems conventionally include a content server, a content player (also referred to herein as a "client"), and a communications network connecting the content server to the content player. The content server is configured to store digital content files, which can be downloaded from the content server to the content player. Each digital content file corresponds to a specific identifying title, such as "Gone with the Wind," which is familiar to a user. The digital content file typically includes sequential content data, organized according to playback chronology, and may comprise audio data, video data, or a combination thereof. The content player is configured to download and play a digital content file, in response to a user request selecting the title for playback. Playback typically involves a technique known in the art as "streaming," whereby the content server sequentially transmits the digital content file to the content player, and the content player plays the digital content file while content data is received that comprises the digital content file. Importantly, proper playback of digital content files requires that both the content server and the content player operate according to a set of standards.

Typically, a small number of content servers provide the digital content files to a large number of content players that are manufactured using various hardware and software platforms, e.g., television systems, cable box systems, set top box systems and videogame systems. To maintain uniform functionality across these various content players, manufacturers are often required to certify that their device is compatible with the set of standards before being sold to consumers. However, proving compatibility requires rigorous testing of the content player and, further, requires high-bandwidth network access. One test often performed is to check the quality of video output of the content player against a known reference video.

Traditionally, the video comparison involves the comparison of consecutive frames, each of which frame includes a large number of pixels where each pixel is represented by a Y, U and V value (or R, G, B value). Comparing each of these YUV values for every pixel in every frame in a video stream is very resource intensive, and therefor limiting in most cases.

SUMMARY

Accordingly, there are provided herein systems and methods that compare a test video frame or sequence against a reference video frame or sequence using hash values.

In a first aspect, a computer implemented method of hashing an image is disclosed. The method includes: receiving a reference image frame; deriving an array of reference hash values to represent the reference image frame, wherein the array of reference hash values includes a first reference hash value, a second reference hash value, and a third reference hash value; receiving an test image frame; deriving an array of hash values to represent the test image frame, wherein the array of hash values includes a first test hash value, a second test hash value, and a third test hash value; subtracting the array of test hash values representing the test image frame from the array of reference hash values representing the reference image frame to produce a delta array, wherein the delta array is indicative of an area where the test image frame differs from the reference image frame.

In a second aspect, a system for processing video images is disclosed. The system includes: an image hashing module configured to: receive a test image frame, derive an array of hash values to represent the test image frame, wherein the array of hash values includes a first test hash value, a second test hash value, and a third test hash value; and an image comparison module configured to: receive an array of hash values to represent a reference image frame, wherein the array of hash values includes a first test reference value, a second reference hash value, and a third reference hash value; and subtract the array of test hash values representing the test image frame from the array of reference hash values representing the reference image frame to produce a delta array, wherein the delta array is indicative of an area where the test image frame differs from the reference image frame.

In a third aspect, a computer-readable medium having computer-executable instructions is disclosed. The computer-readable medium having computer-executable instructions, which when executed on a processor, direct a computer to: receive a test image frame, derive an array of hash values to represent the test image frame, wherein the array of hash values includes a first test hash value, a second test hash value, and a third test hash value; receive an array of hash values to represent a reference image frame, wherein the array of hash values includes a first test reference value, a second reference hash value, and a third reference hash value; and subtract the array of test hash values representing the test image frame from the array of reference hash values representing the reference image frame to produce a delta array, wherein the delta array is indicative of an area where the test image frame differs from the reference image frame.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

DETAILED DESCRIPTION

Figure 1:
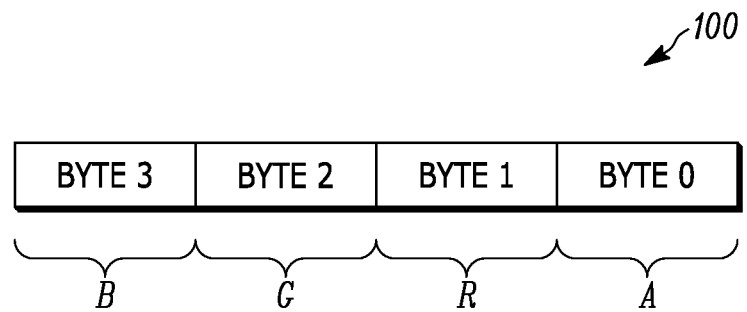
FIG. 1 is a block diagram showing an RGB pixel in an 8-bit per channel representation stored in packed format as a little-endian DWORD.

The present disclosure describes methods and systems for comparing a test video frame or sequence against a reference video frame or sequence using hash values. In some embodiments, each video frame is represented by three uniquely created hash values. Hence a video sequence may be represented by a sequence/array of three values. Each of these three values corresponds to a hash that may be computed on all the individual component values (YUV or RGB) of every pixel in the frame. Additionally, the reference video may be stored as an array of three hash values. This saves memory space as well as computation time when compared with video output under test.

Color Pixel Background

In video and imaging systems, color generally is represented as vector coordinates in a three dimensional "color space." Common examples include the well-known classes of RGB and YUV color spaces. The RGB color spaces specify pixel values using coordinates that represent intensities of red, green and blue light, respectively. The YUV color spaces specify pixel values using coordinates that represent a luminance or chrominance value. As provided herein, RGB and YUV are used interchangeably throughout this disclosure.

When YUV data is stored in a digital or analog form, the ranges for each of the components are typically distinguished using a variation of the YUV notation. For example, the notation Y'Pb'Pr' refers to nonlinear YUV data where the Y component is in the range of [0 . . . 1] (0 being black, 1 being white) and the chroma components (U and V) range from [−0.5 . . . 0.5]. As another example, data stored in an 8-bit or 10-bit fixed point approximation is denoted using the notation Y'Cb'Cr'.

For video, pixel data is typically represented using the YUV color spaces, which can be derived from RGB information. Conversion between the RGB and YUV color spaces typically involves a simple transform. For example, the Y'Pb'Pr' color data is a variation of the R'G'B' color space where the Y' component is proportional to the perceptual brightness (Y'=0.299R'+0.587G'+0.114B'), and the Pb' and Pr' components are defined as color difference from the brightness (e.g., Pb'=B'−Y'; Pr'=R'−Y').

When Y'Pb'Pr' is stored in an 8-bit approximation, the Y' range [0 . . . 1] is mapped to the range 16 . . . 235. The chroma components Pb' and Pr' are mapped to their corresponding Cb' and Cr' components by mapping the range of [−0.5 . . . 0.5] to an interval of width 224 centered about 128 (i.e. 16 to 240). For example, an 8-bit representation is computed as:

$Y'=16+Y'*219$ $Cb'=128+Pb'*224$ $Cr'=128+Pr'*224$

Higher bit precisions are computed by simply scaling up the 8-bit values. For example, an n-bit representation is computed as:

$Y'=(16+Y'*219)*2^{n-8}$ $Cb'=(128+Pb'*224)*2^{n-8}$ $Cr'=(128+Pr'*224)*2^{n-8}$

Pixel data can be stored in a packed format or planar format. In a packed format, the components corresponding to a given pixel are stored as a cluster or group in a single array in memory, and data for all components can be obtained in a single read. Packed formats can be convenient when performing operations on an entire pixel, but can be inefficient if an operation on a single channel (e.g., an operation on the R channel for an RGB pixel) is desired.

For example, in FIG. 1 an RGB pixel in an 8-bit per channel representation is stored in packed format as a little-endian DWORD 100. The data for the RGB pixel comprises 24 bits of color information in adjacent bytes in memory (one byte each for the R, G, and B channels), along with an 8-bit alpha (or transparency) value. Because DWORD 100 is little-endian, Byte 0 (which contains the alpha value) appears on the far right as the least significant byte. As shown in FIG. 1, in an 8-bit representation a pixel with three full-resolution channels of color information will have 24 bits of color data. For memory alignment and access efficiency reasons, pixel data is often stored on a 16- or 32-bit boundary. Therefore, a pixel with 24 bits of color data is typically stored along with an 8-bit alpha value, so that the pixel data for each pixel occupies 32 bits.

Figure 2:
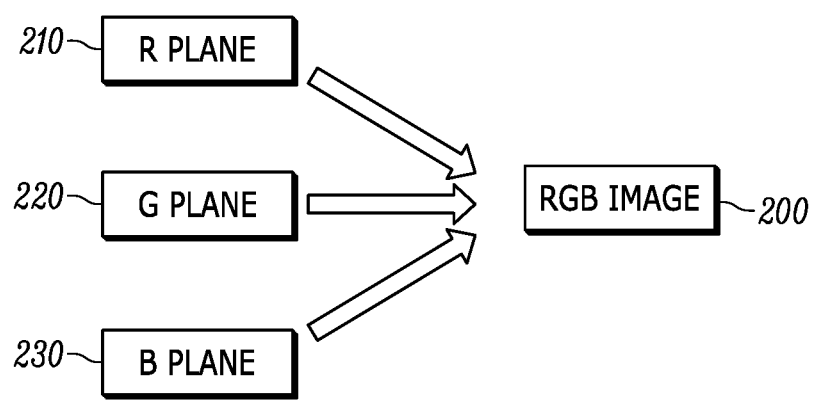
FIG. 2 is a block diagram showing a planar format for an RGB image.

In a planar format, information from different channels is stored in separate planes, rather than being grouped into a single array. For example, in FIG. 2 data for an RGB image 200 is stored in an R plane 210, a G plane 220, and a B plane 230. In an 8-bit representation, each pixel would include 8 bits of information from each plane. Planar formats can be inefficient when performing operations on an entire pixel because getting data for an entire pixel requires three reads—one for each plane. However, planar formats can be convenient in other situations, such as when performing an operation on a single channel (e.g., filtering out all of the red in an RGB image).

Hash Function Background

Hash functions are used in many areas such as database management, querying, cryptography, and many other fields involving large amounts of raw data. A hash function maps large unstructured raw data into relatively short, structured identifiers (the identifiers are also referred to as "hash values" or simply "hash"). By introducing structure and order into raw data, the hash function drastically reduces the size of the raw data into short identifiers. It simplifies many data management issues and reduces the computational resources needed for accessing large databases. Thus, one property of a good hash function is the ability to produce small-size hash values. Searching and sorting can be done much more efficiently on smaller identifiers as compared to the large raw data. For example, smaller identifiers can be more easily sorted and searched using standard methods. Thus, hashing generally yields greater benefits when smaller hash values are used. Unfortunately, there is a point at which hash values become too small and begin to lose the desirable quality of uniquely representing a large mass of data items. That is, as the size of hash values decreases, it is increasingly likely that more than one distinct raw data can be mapped into the same hash value, an occurrence referred to as "collision". Mathematically, for A alphabets of each hash digit and a hash value length $l$, an upper bound of all possible hash values is $A^l$. If the number of distinct raw data is larger than this upper bound, collision will occur.

Accordingly, another property of a good hash function is to minimize the probability of collision. However, if considerable gain in the length of the hash values can be achieved, it is sometimes justified to tolerate collision. The length of the hash value is thus a trade off with probability of collision. A good hash function should minimize both the probability of collision and the length of the hash values. This is a concern for design of both hash functions in compilers and message authentication codes (MACs) in cryptographic applications.

Good hash functions have long existed for many kinds of video data. These functions have good characteristics and are well understood with respect to using hashes across image values to identify identical or similar images efficiently.

Unfortunately, while there are many good existing functions, slight differences in the images can create major differences in the hashes and vice versa. For example, a slight cropping or shifting of an image does not make much difference to the human eye, but such changes appear very differently in the data domain. Thus, when using conventional hashing functions, a shifted version of an image generates a very different hash value as compared to that of the original image, even though the images are essentially identical in appearance. Another example is the deletion of one line from an image. Most people will not recognize this deletion in the image itself, yet the video data is altered significantly if viewed in the data domain. Thus, in many cases, the hash value is not indicative of anything.

Hash Function for Individual Video Frames

Disclosed herein is a hash function for individual video frames (e.g., of a video sequence). In some embodiments, the hash function depicts some characteristics of the pixels that form it, along with the spatial orientation of the pixels.

As provided above, usually the hash created by using the pixel data of an image/video frame is not indicative of the spatial orientation of the pixel YUV values (or RGB values) that constitute the image. This means that even if the two images are differentiated by only one pixel, the hash values of those two images can be very different. On the other hand, two very different images can create very similar hash values, which creates a problem during image comparison. By looking at the hash values, it can be determined if the images are different, but not how different they are or where the difference lies spatially in the images.

In accordance with an embodiment, disclosed herein is a hash algorithm where by the Hash(Ref Image)−Hash(Test Image) generates an number indicative of the area where the two images are different. The hash may be computed by using the Y, U and V (or R, G, and B) values of each pixel in the image. It is generally understood that each of the Y, U and V values are represented by a 8 bit number, however the process applies for the values represented by 4 bits too.

In some embodiments, for each image, three hash values are created: one for each of the Y, U and V domains of the pixels of the image. So, each image may be represented by a combination of three numbers (HashY, HashU, HashV).

In some embodiments, Hash Y=Σ ($w_{ij}$*(Y value of the pixel at coordinate (i,j))), where $w_{ij}$ is a value represented by the value=(i+j)). It is contemplated that functional value $w_{ij}$ can be made more complex (e.g., (log i+log j), etc.).

As provided, the hash function summation is a summation of i from 0 to number of pixels in the image lengthwise and a summation of j from 0 to number of pixels in the image height wise. This hash value indicates that if the image is represented on a X-Y axis where the left most bottom pixel of the image is represented by coordinates (0,0) and the top right most pixel of the image is represented by coordinates (length of image, height of image) then the pixels nearer to the bottom left corner will contribute less to the hash value than the pixels closer to the upper right corner.

In some embodiments, HashU=Σ ($t_{ij}$*(U value of the pixel at coordinate (i,j))), where $t_{ij}$ is a value represented by (length−i)+(height−j). It is contemplated that tij can be extended to other functions where the values might be easier or faster to compute. Again, the values of i and j are pixel coordinates for an image whose left bottom corner is aligned at coordinate (0,0) and the right top corner is aligned at (length of image, height of image).

In some embodiments, HashV=Σ ($s_{ij}$*(V value of the pixel at coordinate (i,j))), where the value of $s_{ij}$ is represented by:

(i+j) when i<=length/2 and j<=height/2

(i+height−j) when i<=length/2 and j>height/2

(length−i+j) when i>length/2 and j<=height/2

(length−i+height−j) when i>length/2 and j>height/2

Again, the values of i and j are pixel coordinates for an image whose left bottom corner is aligned at coordinate (0,0) and the right top corner is aligned at (length of image, height of image).

In some embodiments, hash functions $w_{ij}$, $t_{ij}$ and $s_{ij}$ represent one kind of hash function that may be used. Disclosed concepts and methods can be extended to other hash functions, e.g. log(i+j), 2*i+j etc. Each of these different hash functions will generate different values, which can be adapted into the present methods.

Using the hash functions mentioned above, an image can be represented by 3 values (HashY, HashU and HashV). A video can be represented by a sequence of images and hence can be represented by an array of these three values. The reference video can then we represented by Ref[3][# of images in video] and the test video can be represented by test[3][# of images in test video]. Generally, the reference video and test video has the same amount of images.

Now that there are two arrays (e.g., reference array and test array), a simple comparison is performed on the arrays. As provided above, the Y, U and V values for each image in the test array (and reference array) correspond to a particular index in the array. Consequently, the two arrays are aligned to ensure that the same index is used for both arrays and then the test array is subtracted from the reference array. A value of zero indicates that the two images are similar for that index, while a non-zero value indicates that there is some difference in the two images.

In some embodiments, when two images are different, there is a non-negative number for the difference of all three Y, U and V hash values. When the images are similar, then the difference in the Y, U and V hash values is zero.

In an embodiment, an example is provided herein, focusing on two same index(k) images from the reference and test video. The two images are represented by Ref[HashY, HashU and HashV][k] and Test[HashY, HashU, HashV][k]. Consequently, the difference image of the kth video frame/image is determined as follows: Ref[HashY]−Test[HashY], Ref[HashU]−Test[HashU], Ref[HashV]−Test[HashV].

In the Y domain, Δ Y=Ref[HashY]−Test[HashY] is actually Σ($w_{ij}$*(Y values of ref))−Σ ($w_{ij}$*(Y Values of test))=$w_{ij}$ [Σ (delta of Y values of pixels in ref and test)]. This value Δ Y that is generated from subtracting the two hashes may be populated on the X-Y plane using e.g., a probability picture or graph. This probability picture may be dictated by the $w_{ij}$ function selected. In the present example, a larger value for Δ Y indicates that there is a higher probability of the differences in the two images occurring on the top right side of the images. A lower value for Δ Y indicates that the difference in the images is in the lower left corner of the images. Based on the function $w_{ij}$, the spatial probability graph may be plotted for any value of Δ Y.

In some embodiments, the Δ U and the Δ V are calculated for the U and V domains and populated on probability graphs on the X-Y plane. Now for the kth images, there are three spatial probability graphs depicting the region where the difference in the two images may exist. In some embodiments, an intersection region of high probability in two domains (e.g. Y an U) is determined. High probability is defined herein as a probability over a certain or predetermined threshold. This threshold may vary for different size images and the number of bits, which represent the Y, U and V values of the pixels. In some embodiments, the threshold is determined by how accurately errors should be spotted. For very high quality images, the threshold may be greater than or equal to 0.95 or 95%. In other cases, the threshold may be greater than or equal to 0.85 or 85%. This intersection region represents the region where the images are different. The third domain (e.g., V) may be used to verify that the intersection region also lies in a high probability region of the V domain.

In some embodiments, the intersection region of the first two domains may not align with the high probability region of the third domain. This may occur when the images totally different or spatially misaligned. In these cases, it is assumed that there are gross errors in the test frame and it is tagged as such. However, if the images are similar and aligned, the expectation is that the intersections will align to predict differences.

In some embodiments, the three domains can be used interchangeably if the pixels in all three domains are represented by the same number of bits. If all three domains are not represented by the same number of bits, the domains in which the pixels are represented by higher number of bits may be used for finding the initial intersection, which dictates the area of the image difference. In general, in the YUV domains, Y is usually used.

System Architecture

Figure 3:
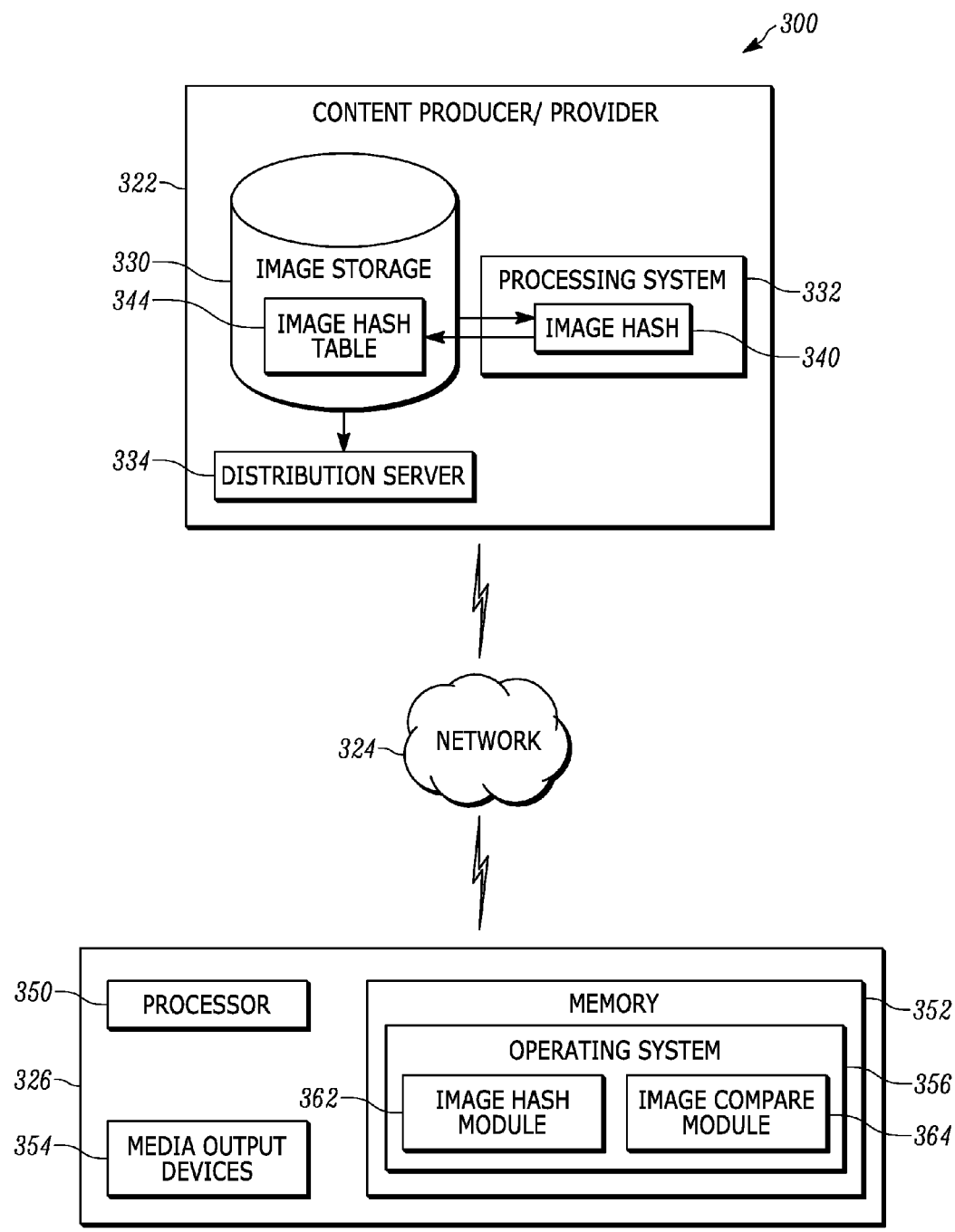
FIG. 3 is a block diagram of an image distribution system in which a content producer/provider hashes images and subsequently distributes them to a client over a network.

FIG. 3 shows an image distribution system 300 having a content producer/provider 322 that produces video image frames and sequences and/or distributes the video image frames and sequences over a network 324 to a client device 326. The content producer/provider 322 has an image storage 330 to store video image frames and sequences, a processing system 332 to process the images prior to distribution, and a distribution server 334 to distribute the images over the network 324 (e.g., Internet, LAN, WAN, etc.). The server 334 may be further configured to compress and/or encrypt the images using conventional compression and encryption techniques prior to distributing the content over the network 24.

The processing system 332 has an image hashing unit 340 that hashes individual images to produce hash values that uniquely represent the images, e.g., in a three hash value array [Y,U,V]. The image hashing unit 340 implements the hashing function as described above, which takes an image frame as input, and outputs a hash value for each of the Y, U and V domains of the pixels of the image (HashY, HashU, HashV). The hash value array may be stored in an image hash table 344 in storage 330 and associated via the table 344 with the original image from which the hash is computed. This image hash table 344 can be used to index the image storage 330. Generally, the image hashing unit 340 performs the hashing function on the reference video image frame or sequences and stores the reference hash arrays in the image hash table 344. As used herein, the reference video frame or sequences refers to a video stream that is known to be of an acceptable quality. For example, in some embodiments, the reference frames are obtained from the video output of a known good video source such as a pre-qualified and tested set-top box.

It is noted that the image hashing unit 340 may be implemented in software or firmware. This component may be constructed as part of a processing system, incorporated into other applications or an operating system, or formed as separate standalone module. The content producer/provider 322 may be implemented in many ways, including as one or more server computers configured to store, process, and distribute images and sequences.

The client device 326 is equipped with a processor 350, a memory 352, and one or more media output devices 354. The processor 350 runs various tools to process the video image frames and sequences, such as tools to decompress the images, decrypt the date, and/or apply controls (size, rotation, etc.). The memory 352 stores an operating system 356, such as a Windows brand operating system from Microsoft Corporation, which executes on the processor. The client device 326 may be embodied in a many different ways, including a computer, a handheld entertainment device, a set-top box, a television, and so forth.

The operating system 356, or any trusted software or hardware on the client machine, may implement a client-side image hash module 362 and image compare module 364. Image hashing module 362 may be similar to image hashing unit 340, however the hashing function is performed on the test video frames or sequences (e.g., the video streaming from client device 326 to a user). Image compare module 364 compares the hash values from the reference video e.g., stored in image hash table 344, with the hash values for the test video frames or sequences. Such comparison methods are described below with reference to FIGS. 4 and 5.

As used herein, the test video frame or sequences refers to a video stream that is of unknown quality. For example, in some embodiments, the test frames are extracted from the video output of a device under test such as a set-top box that is being tested or qualified.

Implementation

Figure 4:
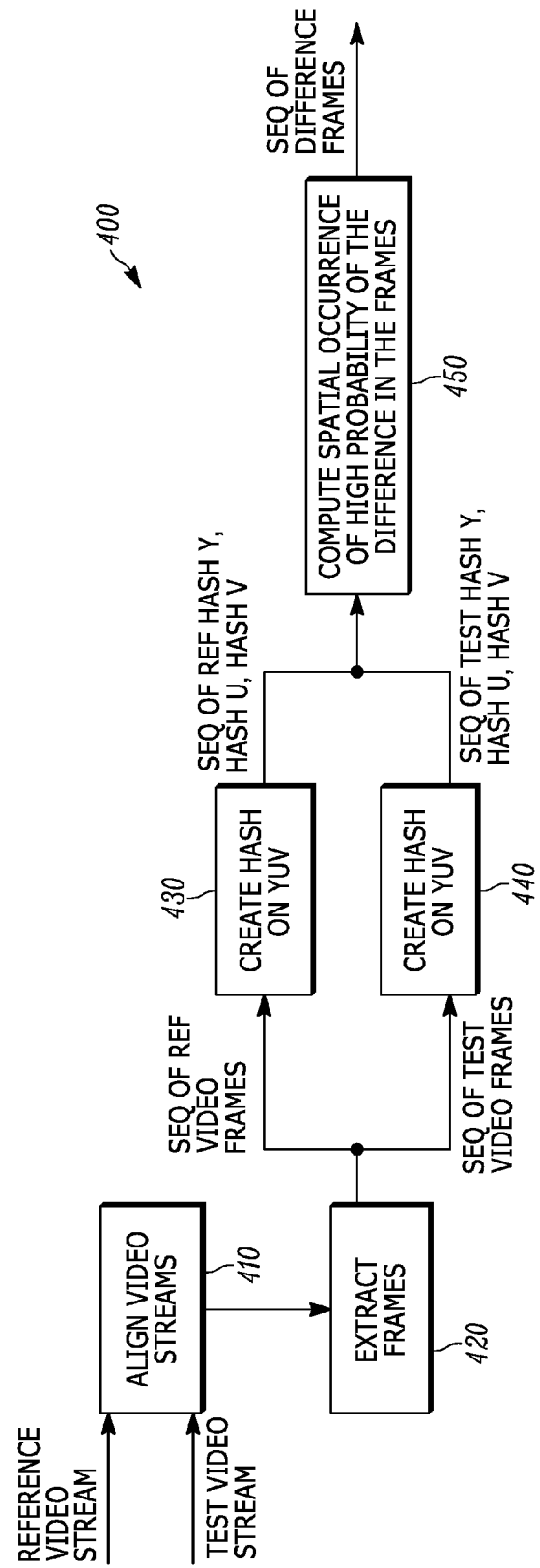
FIG. 4 is a flowchart illustrating a method for comparing a test frame with a reference frame in accordance with an embodiment.

FIG. 4 is a flowchart illustrating a method 400 for comparing a test frame with a reference frame in accordance with an embodiment. Method 400 begins in block 410 where a reference video stream and a test video stream are received. In block 400, the reference video stream and test video stream are aligned. At block 420, one or more frames are extracted from each of the video streams.

At block 430, a hash value is created for each YUV components of the sequence of reference video frames extracted. At block 440, a hash value is created for each YUV components of the sequence of test video frames extracted. The hash values may be created according to hash functions described in the present disclosure. Alternatively, other hash functions may be used, provided that the hash functions provide a hash value for each of the Y, U and V domains of the pixels of each video frame.

Thereafter, the hash values for the reference frames are compared against the hash values for the test frames. Based on the differences in the frames, the spatial occurrence of high probability is computed at block 450.

Figure 5:
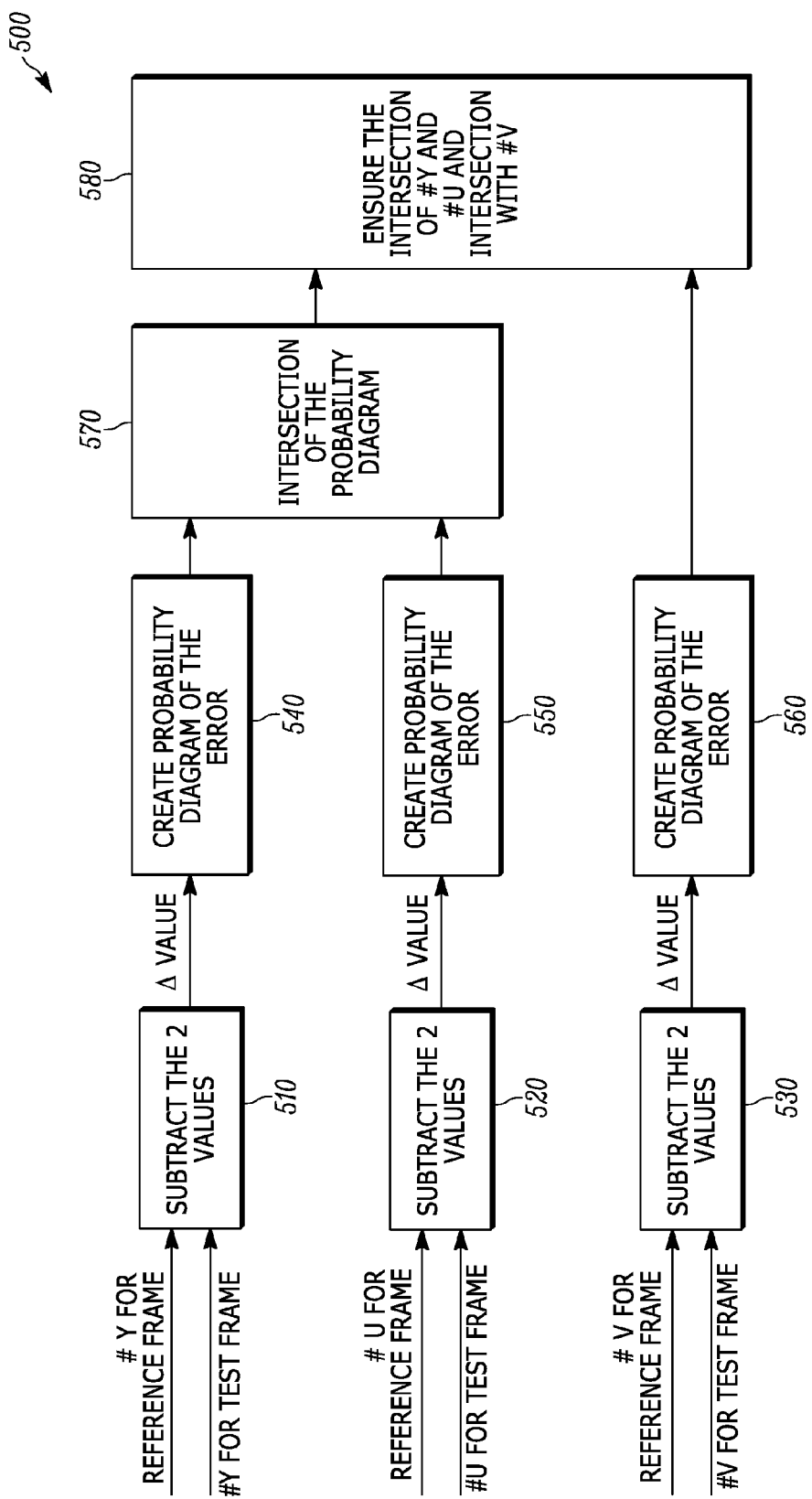
FIG. 5 is a flowchart illustrating a method for determining an error in a test frame in accordance with an embodiment

FIG. 5 is a flowchart illustrating a method 500 for determining an error in a test frame in accordance with an embodiment. Method 500 begins in block 510 where the hash value for the Y domain of the reference frame is compared with the hash value for the Y domain of the test frame. As provided, the Test[HashY] is subtracted from Ref[HashY] to yield a Δ Y value.

Similarly, at block 520, the hash value for the U domain of the reference frame is compared with the hash value for the U domain of the test frame. As provided, the Test [HashU] is subtracted from Ref[HashU] to yield a Δ U value. Also, at block 530, the hash value for the V domain of the reference frame is compared with the hash value for the V domain of the test frame. As provided, the Test [HashV] is subtracted from Ref[HashV] to yield a Δ V value.

Simply subtracting the two arrays ref[Hash(Y),Hash(U), Hash(V)]−test[Hash(Y),Hash(U),Hash(V)] generates a delta [Hash(Y),Hash(U),Hash(V)]. This delta array may be indicative of the position of the errors in the test video stream and the position of the errors in every frame.

Once the Δ Y value is determined, at block 540, a probability diagram of the error is created. Once the Δ U value is determined, at block 550, a probability diagram of the error is created. Thereafter, at block 570, the intersection of the probability diagram using the probability diagrams from 540 and 550 is determined.

At block 560, a probability diagram of the error is created using the Δ V value. Thereafter, at block 580, the intersection of the probability diagram using Δ Y and Δ U is compared with the probability diagram using Δ V. This comparison at block 580 confirms the spatial location of the video error on the X-Y plane. In case the probability diagram of Δ V does not coincide with the intersection of the probability diagram of Δ Y and Δ U, then it is determined that there are large video errors present on that test frame and it is tagged as such.

As provided above, previous solutions that use image comparison need to compare large amounts of data to find differences in the images spatially. Other faster algorithms just tell if two images are similar or not. The present disclosure, on the other hand, provides a fast solution that indicates the region of the differences of two images. The selection of the hash algorithm provides the position of the error in the frame. This is attributed to the fact that video errors/discrepancies usually occur in all three domains of Y, U and V and the proposed solution will exploits this property to detect errors.

Accordingly, the present disclosure is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the disclosure. In addition, the grouping of functions within a module or step is for ease of description. Specific functions can be moved from one module or step to another without departing from the disclosure.

The various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in computer or machine readable storage media such as RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

We claim:

1. A computer implemented method of hashing an image, comprising:
   receiving a reference image frame;
   deriving an array of reference hash values to represent the reference image frame, wherein the array of reference hash values includes a first reference hash value, a second reference hash value, and a third reference hash value;
   receiving an test image frame;
   deriving an array of hash values to represent the test image frame, wherein the array of hash values includes a first test hash value, a second test hash value, and a third test hash value; and
   subtracting the array of test hash values representing the test image frame from the array of reference hash values representing the reference image frame to produce a delta array,
   wherein the delta array is indicative of an area where the test image frame differs from the reference image frame,
   wherein the first reference hash value is Hash(Y), the second reference hash value is Hash(U) and the third reference hash value is Hash(V), and the reference array is ref[Hash(Y), Hash(U), Hash(V)] and wherein the first test hash value is Hash(Y), the second test hash value is Hash(U) and the third test hash value is Hash(V), and the test array is test[Hash(Y), Hash(U), Hash(V)], and wherein the delta array is delta[Hash(Y), Hash(U), Hash(V)], and
   wherein Hash(Y) is determined according to a hash function:
   Hash(Y)=$\Sigma(w_{ij}$*(Y value of a pixel at coordinates (i,j)) wherein $w_{ij}$ is a value represented by (i+j).

2. The method of claim 1, further comprising:
   storing the array of reference hash values representing the reference image frame.

3. The method of claim 1, wherein each hash value corresponds to an individual component value.

4. The method of claim 3, wherein the individual component value is selected from a YUV domain or a RGB domain.

5. The method of claim 4, wherein the YUV domain or RGB domain is represented by 8-bit values for each component.

6. The method of claim 4, wherein the YUV domain or RGB domain is represented by 4-bit values for each component.

7. The method of claim 1, wherein errors in the image frame occur in two or more domains and wherein the hash values provide the domains.

8. The method of claim 1, wherein the delta array is indicative of the position of errors in the image frame.

9. The method of claim 1, wherein the first reference hash value Hash(Y), the second reference hash value Hash(U) and the third reference hash value Hash(V) as well as the first test hash value Hash(Y), the second test hash value is Hash(U) and the third test hash value Hash(V) are determined using logarithm or multiplier hash functions.

10. The method of claim 1, wherein if the test image frame differs from the reference image frame, the delta array includes non-negative numbers for each of Hash (Y), Hash (U), and Hash(V).

11. The method of claim 1, wherein if the test image frame is similar to the reference image frame, the delta array includes the value 0 for each of Hash (Y), Hash(U), and Hash(V).

12. The method of claim 1, further comprising:
graphing delta[Hash(Y)] on an X-Y plane using a probability picture determined by hash function $w_{ij}$.

13. A computer implemented method of hashing an image, comprising:
receiving a reference image frame;
deriving an array of reference hash values to represent the reference image frame, wherein the array of reference hash values includes a first reference hash value, a second reference hash value, and a third reference hash value;
receiving an test image frame;
deriving an array of hash values to represent the test image frame, wherein the array of hash values includes a first test hash value, a second test hash value, and a third test hash value; and
subtracting the array of test hash values representing the test image frame from the array of reference hash values representing the reference image frame to produce a delta array,
wherein the delta array is indicative of an area where the test image frame differs from the reference image frame,
wherein the first reference hash value is Hash(Y), the second reference hash value is Hash(U) and the third reference hash value is Hash(V), and the reference array is ref[Hash(Y), Hash(U), Hash(V)] and wherein the first test hash value is Hash(Y), the second test hash value is Hash(U) and the third test hash value is Hash(V), and the test array is test[Hash(Y), Hash(U), Hash(V)], and wherein the delta array is delta[Hash(Y), Hash(U), Hash(V)], and
wherein Hash(U) is determined according to a hash function:
Hash(U)=Σ($t_{ij}$*(U value of a pixel at coordinates (i,j))
wherein $t_{ij}$ is a value represented by (length−i)+(height−j).

14. The method of claim 13, further comprising:
graphing delta[Hash(U)] on an X-Y plane using a probability picture determined by hash function $t_{ij}$.

15. A computer implemented method of hashing an image, comprising:
receiving a reference image frame;
deriving an array of reference hash values to represent the reference image frame, wherein the array of reference hash values includes a first reference hash value, a second reference hash value, and a third reference hash value;
receiving an test image frame;
deriving an array of hash values to represent the test image frame, wherein the array of hash values includes a first test hash value, a second test hash value, and a third test hash value; and
subtracting the array of test hash values representing the test image frame from the array of reference hash values representing the reference image frame to produce a delta array,
wherein the delta array is indicative of an area where the test image frame differs from the reference image frame,
wherein the first reference hash value is Hash(Y), the second reference hash value is Hash(U) and the third reference hash value is Hash(V), and the reference array is ref[Hash(Y), Hash(U), Hash(V)] and wherein the first test hash value is Hash(Y), the second test hash value is Hash(U) and the third test hash value is Hash(V), and the test array is test[Hash(Y), Hash(U), Hash(V)], and wherein the delta array is delta[Hash(Y), Hash(U), Hash(V)], and
wherein Hash(V) is determined according to a hash function:
Hash(V)=Σ($s_{ij}$*(V value of a pixel at coordinates (i,j))
wherein $s_{ij}$ is a value represented by (i+j) when i≤length/2 and j≤height/2;
wherein $s_{ij}$ is a value represented by (i+height−j) when i≤length/2 and j>height/2;
wherein $s_{ij}$ is a value represented by (length−i+j) when i>length/2 and j≤height/2;
wherein $s_{ij}$ is a value represented by (length−i+height−j) when i>length/2 and j>height/2.

16. The method of claim 15, further comprising:
graphing delta[Hash(V)] on an X-Y plane using a probability picture determined by hash function $s_{ij}$.

* * * * *